Patented Dec. 22, 1942

2,305,693

UNITED STATES PATENT OFFICE 2,305,693

PROCESS OF MAKING PHOTOGRAPHS

Ludwig Hänel, Berlin-Lichterfelde, Germany; vested in the Alien Property Custodian No Drawing. Application May 31, 1940, Serial No. 338,217. In Germany June 15, 1939

4 Claims. (Cl. 95—5)

The present invention relates to improvements in the process of making photographs which is described in the U. S. A. Patent No. 2,186,942, granted January 16, 1940.

The object of the U. S. A. Patent No. 2,186,942 is a process to make photographs by using such materials which, when exposed to light, take on a different color, and which lose this different color again, either automatically or without chemical treatment, for instance by a suitable exposure to light of another wave length.

As examples of materials of this character there are mentioned in the Patent No. 2,186,942 the fulgides and other phototropic substances, e. g. the $\alpha,\alpha,\delta$-triphenyl-fulgide and the $\alpha,\alpha$-diphenyl-$\delta$-(o-nitro-phenyl)-fulgide.

These fulgides and also the other phototropic substances, produced till now, are more or less intensively colored, these colors being according to the constitution of the fulgides, between the shades of lemon-yellow and of orange-red.

By exposing layers of these phototropic fulgides to light of suitable wave-lengths, their colors change to shades of reddish-brown or reddish-violet to dark-brown, resulting in mixed shades of the unaltered and altered colors.

The mixed colors of the fulgides, known till now impair the quality of the photographs produced by using the fulgides. Furthermore the contrasts in the prints, obtained by using printing-layers of the known fulgides and the like phototropic substances are much smaller than the contrasts in the negatives printed, owing to the intensive color of the not exposed fulgides.

Now, I have found that a special class of fulgides, which is not produced till now, does not possess the above described properties impairing the photographs, obtained by using the known fulgides. This class comprises the fulgides, characterized by the following formula:

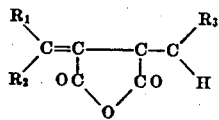

In this formula $R_1$, $R_2$ are aromatic cyclic compounds, which may be the same or such of a different constitution. They may also be substituted by other atoms or groups. $R_3$ is a saturated or an unsaturated aliphatic group, containing a straight or a branched chain of C-atoms, which may be substituted by halogens, hydroxy- or alkoxy-groups.

Fulgides of this class are for example:

$\alpha,\alpha$-Diphenyl-$\delta$-methyl-fulgide
$\alpha,\alpha$-Diphenyl-$\delta$-undecyl-fulgide
$\alpha,\alpha$-Diphenyl-$\delta$-allyl-fulgide
$\alpha,\alpha$-Diphenyl-$\delta$-chlorpropenyl-fulgide
$\alpha,\alpha$-Diphenyl-$\delta$-[2,6-dimethyl-heptenyl-(1)]-fulgide.

So, the invention relates to a process of making photographs, as described in the U. S. Patent No. 2,186,942, using the above described new fulgides.

These new fulgides may be prepared by heating for some hours a diester of the itaconic acid and a suitable aldehyde, eventually using catalytic agents. Hereby esters of the fulgenic acids are produced, which are saponified by the usual saponifying agents. The resultant fulgenic acids are converted in the fulgides in the known manner.

The fulgides of the invention are colorless or practically colorless substances, and excel in this property the fulgides and the other phototropic substances, known heretofore, which all are intensively colored. Further the most of the new fulgides are more sensitive to light of short wave-lengths, than the phototropic substances known till now.

The photographs, produced by using light-sensitive layers, containing the fulgides of the invention, have pure and clear shades of color, which are more agreeable to the eye than the impure, more or less darkish shades of the mixed colors of the photographs, obtained by using the fulgides and the other phototropic substances, known till now. Further the contrasts in the photographs, made by using the fulgides according to the invention, are much greater than the contrasts in the photographs, produced by using the known fulgides, owing to the fact that the new fulgides are colorless or practically colorless.

The photographs and prints, obtained by the use of the new fulgides possess a very good stability, when exposed to diffused light, or in the dark. They may be extinguished very quickly by exposing them to light of long wave length.

For making photographs, the fulgides according to the invention are employed in layers, which may contain binding agents or not. These layers may be applied to supports or carriers.

When used without binding agents, the fulgides preferably may be cemented to supports.

The layers of the fulgides containing binding agents, are prepared from emulsions of the fulgides and colloids, produced by mixing them. Suitable colloids for the making of the emulsions are gelatine, albumines and other proteins, cellulose, collodion, cellulosic esters and ethers, natural and artificial resins and polymerisates and the like.

These emulsions may be poured in sheets or foils, or applied to supports or carriers, making use of the processes, known in the photographic industry. Suitable supports are plates of glass, films of cellulose, of cellulosic esters or ethers, of resins, of polymerisates, foils of metals, paper, webs and the like.

What I claim is:

1. A process of making photographic positives, including the steps of illuminating a layer of fulgides having a formula

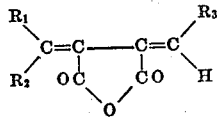

wherein $R_1$ and $R_2$ are members of the group consisting of aromatic cyclic compounds and $R_3$ is a member of an aliphatic group containing a chain of carbon atoms, with colored light of a predetermined wave length, through a negative, said fulgide being adapted to vary its color differentially in accordance with the intensity of the light striking different area portions of the exposed layer, and then subjecting the layer of fulgides to light of another predetermined different wave length, whereby said layer of fulgides reassumes its original color.

2. A process of making photographs, including the steps of illuminating a layer of fulgides having the formula

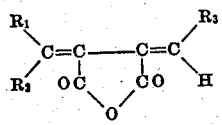

wherein $R_1$ and $R_2$ are identical members selected from the group consisting of aromatic cyclic compounds, and $R_3$ is a member of an aliphatic group containing a chain of carbon atoms through a negative with a colored light of a predetermined wave length, said layer of fulgide being adapted to vary its color differentially in accordance with the intensity of the light striking different area portions of the exposed layer, and said layer of fulgides being adapted to reassume its original color when exposed to a light of a different wave length, whereby the picture produced through illumination of the fulgides through the negative with light of the first described wave length will be extinguished.

3. A process of making photographic positives, including the steps of illuminating a layer of fulgides having the formula

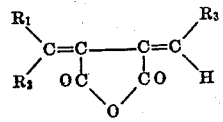

wherein $R_1$ and $R_2$ are members of the group consisting of aromatic cyclic compounds, and $R_3$ is a member of the group of aliphatic compounds containing a branched chain of carbon atoms through a negative with colored light of a predetermined wave length, said layer of fulgide being adapted to change its color under the influence and in accordance with the intensity of illumination by said light passing through the negative, and then subjecting the layer of fulgides to light of another predetermined different wave length, said layer of fulgides being adapted to change back to the original color under the influence of said second illumination, whereby the picture produced on said layer by the first illumination is caused to disappear.

4. A light sensitive layer consisting of a fulgide having the formula

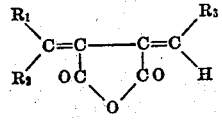

wherein $R_1$ and $R_2$ are members of the group consisting of aromatic cyclic compounds, and $R_3$ is a member of the group of aliphatic compounds containing a chain of carbon atoms.

LUDWIG HÄNEL.